Patent Office 3,379,726
Patented Apr. 23, 1968

3,379,726
TETRAHYDROPYRIDAZINES
Thomas Alfred Montzka, Manlius, and Nancy McMurry Cladel, Syracuse, N.Y., assignors to Bristol-Myers Company, New York, N.Y., a corporation of Delaware
No Drawing. Filed Nov. 4, 1964, Ser. No. 408,728
2 Claims. (Cl. 260—250)

ABSTRACT OF THE DISCLOSURE 1,3,6-trimethyl-1,4,5,6-tetrahydropyridazines are useful agents as monoamine oxidase inhibitors and antidepressant agents in animals, including man. In particular the compound 1,3,6-trimethyl-4-phenyl-1,4,5,6-tetrahydropyridazines and its pharmaceutically acceptable salts are claimed.

BACKGROUND OF THE INVENTION

1. Field of the invention

The substituted tetrahydropyridazines of the present invention are useful monoamine oxidase inhibitors for treatment of central nervous system depression.

2. Description of prior art

The compounds of the present invention are new and novel.

SUMMARY OF THE INVENTION

The compounds of the present invention are characterized as having the formula:

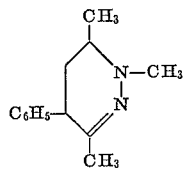

and the nontoxic pharmaceutically acceptable acid addition salts thereof.

This invention relates to novel compounds as new compositions of matter and the methods of preparation of the same. It also deals with compositions and the method of treating depression of the central nervous system and, more particularly, to the use of certain tetrahydropyridazines as central nervous system stimulants.

The present invention provides a member selected from the group consisting of a free base of the formula

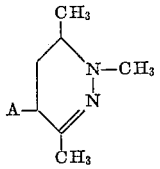

wherein A is a member selected from the group consisting of hydrogen and phenyl; and nontoxic, pharmaceutically acceptable salts thereof.

The preferred compounds of the present invention are the free base and acid addition salts of 1,3,6-trimethyl-1,4,5,6-tetrahydropyridazine. A particularly preferred embodiment of the present invention is 1,3,6-trimethyl-1,4,5,6-tetrahydropyridazine hydroiodide.

The compounds of the present invention may be prepared by the reduction of the appropriate pyridazine salt by any of the methods known to reduce a pyridazine ring. Preferred methods include hydrogenation in the presence of either a noble metal catalyst or Raney nickel and reduction by the use of simple and complex metal hydrides and borohydrides. A suitable metal hydride would be, for example, lithium aluminum hydride (LiAlH$_4$) and suitable borohydrides include sodium borohydride (NaBH$_4$) and potassium borohydride (KBH$_4$).

As a therapeutic agent, the tetrahydropyridazine moiety may be employed in the free base form or as acid addition salts (with organic and inorganic acids) which are the full equivalents of the free bases. Acid addition salts, such as for example the hydroiodide, hydrochloride, hydrobromide, sulphate, phosphate or acetate, may be employed in this aspect of the invention. These and other nontoxic, pharmaceutically acceptable salts of the tetrahydropyridazines of the present invention can be prepared by mixing the base with an appropriate salt-forming agent, such as an organic or inorganic acid in inert solvent. It is possible to prepare one of the salts of 1,3,6-trimethyl 1,4,5,6-tetrahydropyridazine such as for example, the hydroiodide, by the catalytic reduction of 3,6-dimethylpyridazine methiodide and proceed to other salts, such as the acetate, by reacting with the corresponding silver salt, silver acetate in this case. Any of the other desired salts or the free base may then be prepared by various conventional chemical techniques, which would be clearly understood by one skilled in the art. If it is desired to employ one of the compounds of the present invention in the form of the free base, it may be obtained according to conventional procedure, for example, by conducting the reduction reaction for its production in a suitable solvent, and then evaporating the solvent to obtain the reaction product. For example, the preferred compound of the present invention, 1,3,6-trimethyl-1,4,5,6-tetrahydropyridazine hydroiodide may be dissolved in a suitable aqueous basic medium, for example ten percent sodium carbonate, and then the solution is extracted using a suitable organic solvent such as diethyl ether and the organic solvent is evaporated to leave the reaction product as the free base, in this preferred case, 1,3,6-trimethyl-1,4,5,6-tetrahydropyridazine, in the form of an oil.

The compounds of the present invention are useful in animals, including man, as monoamine oxidase inhibitors and anti-depressant agents. When the compounds of the present invention are administered to mice they have the ability to inhibit the monoamine oxidase enzyme. In mice the compounds of the present invention have also demonstrated a central nervous system stimulating activity when administered orally.

The compositions of this invention may be prepared in various unit dosage forms for oral administration or intravenous, intramuscular or subcutaneous injection. The dosage is dependent upon the route of administration, the results to be achieved and the weight and condition of the patient. The dosage of the preferred compound is most conveniently administered orally in unit dosage form containing 5 mg. to 500 mg. of the active compound together with pharmaceutically acceptable carriers and diluents.

Examples of pharmaceutical forms acceptable for oral administration in unit dosage forms are tablets, capsules, pills, granules or powders. In addition, the compounds of the present invention may be prepared in liquid dosage forms for oral administration as suspensions, emulsions or solutions. For injectable products, sterile suspensions or solutions and isotonic formulations may be prepared according to the customary practices of the pharmaceutical industry.

The term "unit dosage form" as used in this specification means a physically distinct entity for administration of a compound, each entity containing a predetermined quantity of a compound of the present invention. Examples of suitable oral unit dosage forms are capsules, pills, tablets, cachets and powder packets for solid compositions and teaspoonfuls, dropperfuls, ampoules and vials for liquid oral dosage forms.

The compound of the present invention can be prepared in combination with other therapeutically active ingredients and in laminated or other forms to provide for time release action of the active compounds. An inner dosage portion and an outer dosage portion separated by an enteric layer and combined into a tablet or capsule may provide a delayed or time release action where the enteric layer is so constituted as to serve to delay the release of the active compound contained in the inner portion by resisting disintegration for a period of time. During the delay the outer portion disintegrates in the stomach and the active compound contained in that portion becomes involved in the mechanism of its therapeutic action. Upon the subsequent destruction of the enteric layer the inner portion becomes involved in the mechanism of its therapeutic action. Such an enteric layer may consist of one or more of any number of substances known in the art such as a number of polymeric acids or mixtures of polymeric acids with such materials as cellulose acetate, and cetyl alcohol, shellac and the like.

The unit dosage forms containing the compounds of the present invention can include other pharmaceutically active compounds such as sedatives, vitamins, hormones, hypotensives, ataractics, antispasmodics and tranquilizers to provide concomitant therapeutic action.

It is generally accepted that elevation of certain brain amines result in psychic effects clinically. These effects take the form of mood elevation or antidepressant action.

Brain norepinephrine and serotonin are brain amines chiefly metabolized by the enzyme monoamine oxidase. Inhibitors of this enzyme produce a characteristic elevation of these brain amines; and the ability of a compound to increase the level of brain norepinephrine and serotonin is well correlated with central monoamine oxidase inhibition.

The effect of the compounds of this invention on brain norepinephrine and serotonin was determined in mice by the method of Shore et al. (J. Pharmacol., 112, 295–300, 1958), as modified by Mead et al. (Bioch. Pharmacol., 6, 52–53, 1961), for the simultaneous extraction of both norepinephrine and serotonin from the same homogenate. The method involves extraction of norepinephrine and serotonin into butanol, return of the amines to an aqueous phase and conversion to a fluorescent derivative. Norepinephrine was determined by oxidation at pH 5, in trihydroxyindole, and serotonin by its native fluorescence into 3 N hydrochloric acid. The brains of eight mice were pooled for each determination, and the compound was administered orally. The level of brain amines was determined at different intervals after administration, and a control group was run in each experiment.

The preferred compound of the present invention, 1,3,6-trimethyl-1,4,5,6-tetrahydropyridazine hydroiodide was shown to be a potent elevator of brain amines and a powerful antidepressant agent. Monoamine oxidase inhibition was demonstrated at a minimum effective dose of 38 mg./kg. administered orally. An oral dosage of 844 mg./kg. P.O. of this compound proved lethal to fifty percent of the mice.

The antidepressant activity of the preferred compound was further demonstrated in mice by the reserpine reversal method. For example, 1,3,6-trimethyl-1,4,5,6-tetrahydropyridazine hydroiodide administered to mice at doses as low as 19 mg./kg. P.O. prior to treatment with 5 mg./kg. reserpine prevented the usual sedative effect of the reserpine. Thus, the preferred compound of the present invention is a powerful monoamine oxidase inhibitor, and exhibits marked antidepressant activity. In addition, this compound was observed to have some hypotensive activity.

The other compounds of this invention are also capable of inhibiting monoamine oxidase in mice. Oral administration of 300 mg./kg. of either isomer A or isomer B (as described in Example 2) of 1,3,6-trimethyl-4-phenyl-1,4,5,6-tetrahydropyridazine hydroiodide in mice resulted in elevated brain amine levels. These compounds, when administered intraperitoneally to mice, exhibited an $LD_{50}$ of approximately 450 mg./kg.

Preparation of 3,6-dimethylpyridazine methiodide

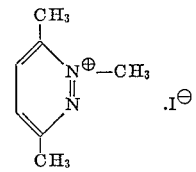

3,6-dimethylpyridazine was prepared according to the method of C. G. Overberger, N. R. Byrd and R. B. Mesrobian, J. Am. Chem. Soc., 78, 1961 (1956) and 48.5 g. (0.448 mole) was dissolved in 200 ml. acetone and 100 ml. of ethanol. A 4 molar excess of methyl iodide was added and the mixture cooled in an ice bath with stirring for two hours. The product, 3,6-dimethyl-pyridazine methiodide, separated as crystals.

*Analysis.*—Calculated for $C_7H_{11}N_2I$: C, 33.61; H, 4.43; N, 11.20. Found: C, 33.76; H, 4.44; N, 11.13.

The following examples are given in illustration of but not in limitation of the present invention.

Example 1

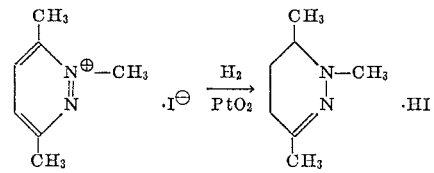

3,6-dimethyl-pyridazine methiodide (6.25 g., 0.025 mole) prepared according to the foregoing procedure was added to a suspension of platinum oxide, suspended in 100 ml. of methanol and the mixture was hydrogenated on a Paar apparatus. The reaction mixture took up the theoretical amount of hydrogen (0.05 mole) in two hours. The solvent was removed under reduced pressure to leave the product, 1,3,6-trimethyl-1,4,5,6-tetrahydropyridazine hydroiodide, as a yellow oil which was induced to crystallize by scratching. The crystals were recrystallized from ethyl acetate-ethanol several times yielding 2.8 g. of 1,3,6-trimethyl-1,4,5,6-tetrahydropyridazine hydroiodide, M.P. 101–104° C.

*Analysis.*—Calculated for: $C_7H_{15}N_2I$: C, 33.08; H, 5.95; N, 11.02. Found: C, 33.30; H, 6.02; N, 10.60.

Example 2

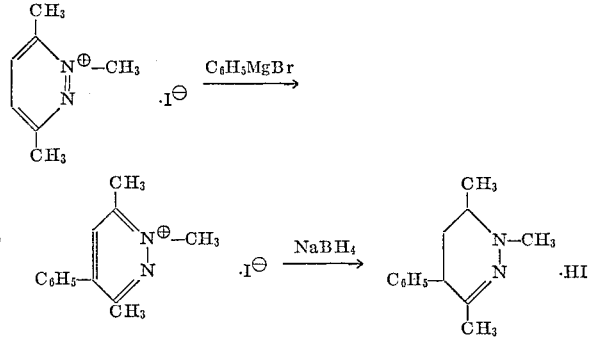

Solid 3,6-dimethyl-pyridazine methiodide (26.6 g., 0.11 mole) prepared according to the above procedure was added to a solution of phenyl magnesium bromide (0.15 mole) and 15 ml. of ether (prepared from 16.6 ml. bromobenzene and 3.6 g. magnesium) with stirring over a period of 15 minutes. Stirring of the mixture was continued for one hour at 20° C. and then poured onto a mixture of cracked ice and dilute sulfuric acid. The ether layer was separated and discarded. The aqueous layer was repeatedly extracted with chloroform. The chloroform extracts were dried over magnesium sulfate and concentrated to give an orange solid which was treated with dry acetone and collected to give 15 g. of 3,6-dimethyl-4-phenylpyridazine methiodide in the form of pale yellow crystals (128–134° C.). A purified sample was obtained by recrystallization from acetone and then isopropanol.

*Analysis.*—Calculated for $C_{13}H_{17}N_2I$: C, 47.57; H, 5.22; N, 8.53. Found: C, 47.75; H, 5.20; N, 8.53.

3,6-dimethyl-4-phenyl-pyridazine methiodide (11.6 g., 0.035 mole) was suspended in 50 ml. of methanol and 85 ml. of water and 1.4 g. of sodium hydroxide was added with excess sodium borohydride (2.0 g.). The mixture was warmed to 55–62° C. with stirring for 45 minutes and then allowed to cool to 20° C. with stirring for one hour. The mixture containing 1,3,6-trimethyl-4-phenyl-1,4,5,6-tetrahydropyridazine was extracted with ether and the ether extraction was then extracted with dilute hydrochloric acid to give an orange aqueous solution of 1,3,6-trimethyl-4-phenyl-1,4,5,6-tetrahydropyridazine hydrochloride. Excess potassium iodide was added to the solution which resulted in the precipitation of 4.5 g. of solid colorless powder which by several crystallizations from chloroform-ether yielded two isomers of 1,3,6-trimethyl-4-phenyl-1,4,5,6-tetrahydropyridazine hydroiodide designated as isomer A and isomer B. Isomer A gave a melting point of 135–139° C. and an

*Analysis.*—Calculated for $C_{13}H_{19}N_2I$: C, 47.28; H, 5.79; N, 8.65. Found: C, 47.30; H, 5.78; N. 8.65.

Isomer B gave a melting point of 145–147° C.

*Analysis.*—Calculated for $C_{13}H_{19}N_2I$: C, 47.28; H, 5.79; N, 8.49. Found: C, 47.55; H, 5.94; N, 8.59.

Example 3

As an alternate procedure to the sodium borohydride reduction of Example 2, 4-phenyl-3,6-dimethyl-pyridazine methiodide (13.5 g., 0.041 mole) prepared according to the procedure of Example 2 above was hydrogenated in 200 ml. of methanol with 0.4 g. of platinum oxide as a catalyst on a Paar hydrogenator. The theoretical amount of hydrogen was taken up in 15 minutes. The mixture was filtered and the solvent removed from the filtrate under reduced pressure to give a yellow oil which was washed with water to give 1,3,6-trimethyl-4-phenyl-1,4,5,6-tetrahydropyridazine hydroiodide in the form of a white solid, M.P. 135–136° C. A nuclear magnetic resonance study confirmed that this was the same compound as isomer A of Example 2.

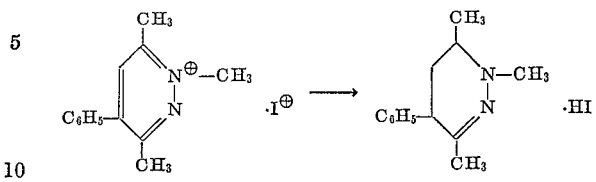

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The compound of the formula

2. A nontoxic pharmaceutically acceptable acid addition salt of the compound of the formula

References Cited

Cohen et al.: J. Amer. Chem. Soc., vol. 84, page 590 (1962).

NICHOLAS S. RIZZO, *Primary Examiner.*